United States Patent
Lesanko et al.

(10) Patent No.: US 11,592,019 B2
(45) Date of Patent: Feb. 28, 2023

(54) METHOD AND SYSTEM FOR CONTROLLING MULTIPLE PUMP JACKS

(71) Applicant: LIFTING SOLUTIONS INC., Edmonton (CA)

(72) Inventors: Michael Lesanko, Edmonton (CA); Stephen Hanchurak, Edmonton (CA)

(73) Assignee: Lifting Solutions Inc., Edmonton (CA)

( * ) Notice: Subject to any disclaimer, the term of this patent is extended or adjusted under 35 U.S.C. 154(b) by 170 days.

(21) Appl. No.: 17/187,000

(22) Filed: Feb. 26, 2021

(65) Prior Publication Data
US 2021/0270256 A1    Sep. 2, 2021

Related U.S. Application Data
(60) Provisional application No. 62/983,410, filed on Feb. 28, 2020.

(51) Int. Cl.
| | | |
|---|---|---|
| *F04B 47/04* | (2006.01) | |
| *F03G 3/00* | (2006.01) | |
| *E21B 43/12* | (2006.01) | |
| *F04B 47/02* | (2006.01) | |

(52) U.S. Cl.
CPC ............ *F04B 47/04* (2013.01); *E21B 43/126* (2013.01); *F03G 3/00* (2013.01); *F04B 47/022* (2013.01)

(58) Field of Classification Search
CPC .......... F04B 47/022; F04B 47/04; F03G 3/00; E21B 43/126
See application file for complete search history.

(56) References Cited

U.S. PATENT DOCUMENTS

| | | | | |
|---|---|---|---|---|
| 5,481,873 A * | 1/1996 | Saruwatari | ............. | F04B 47/04 91/518 |
| 8,037,012 B1 * | 10/2011 | Svinos | ...................... | G06F 1/00 706/62 |
| 9,041,332 B2 * | 5/2015 | DaCunha | ............... | G01R 21/00 713/340 |
| 11,060,517 B1 * | 7/2021 | Dreher | ................... | F16H 21/22 |
| 11,204,028 B1 * | 12/2021 | Dreher | ................... | F04B 49/20 |
| 2013/0116850 A1 * | 5/2013 | Blatner | ................... | B66F 19/00 700/297 |
| 2014/0322049 A1 * | 10/2014 | Graybill | ............... | F04B 17/006 417/411 |
| 2015/0240800 A1 * | 8/2015 | Hiraide | .................. | F04B 47/04 417/213 |
| 2015/0308242 A1 * | 10/2015 | Suprick | ................ | E21B 47/009 700/282 |
| 2017/0370358 A1 * | 12/2017 | Graybill | ............... | F04B 17/006 |
| 2019/0063263 A1 * | 2/2019 | Davis | ...................... | E21B 43/26 |
| 2019/0107105 A1 * | 4/2019 | Doyle | .................... | F04B 47/022 |
| 2020/0217181 A1 * | 7/2020 | Norbeck | ............... | F24T 10/20 |
| 2020/0263531 A1 * | 8/2020 | Fyfe | ........................ | F04B 51/00 |
| 2021/0199107 A1 * | 7/2021 | Redmond | .............. | F04B 49/00 |
| 2021/0270256 A1 * | 9/2021 | Lesanko | ............... | E21B 43/126 |
| 2021/0270257 A1 * | 9/2021 | McCarthy | ............ | F04B 35/008 |
| 2021/0301635 A1 * | 9/2021 | Zahran | .................. | E21B 43/127 |
| 2022/0042400 A1 * | 2/2022 | Latypov | ............... | F04B 47/022 |

* cited by examiner

*Primary Examiner* — David M Fenstermacher
(74) *Attorney, Agent, or Firm* — James A. Sheridan; Sheridan Law, LLC

(57) ABSTRACT

A pump jack controller is provided that can harness the potential energy generated during the operation of one pump jack amongst a plurality of pump jacks located at a well site and convert that potential energy into electrical energy that can be used to provide electrical power generated by the pump jack to power the other pump jacks located at the well site.

18 Claims, 14 Drawing Sheets

FIG. 12

METHOD AND SYSTEM FOR CONTROLLING MULTIPLE PUMP JACKS

CROSS-REFERENCE TO RELATED APPLICATIONS

This application claims priority of U.S. provisional patent application Ser. No. 62/983,410 filed Feb. 28, 2020, which is incorporated by reference into this application in its entirety.

TECHNICAL FIELD

The present disclosure is related to the field of electric controllers for operating pump jacks, in particular, a pump jack controller that can operate multiple pump jacks with reduced electrical consumption from an electric power grid by using electricity generated by the pump jacks when they are operating in a negative torque mode.

BACKGROUND

A pump jack is the above ground drive for a reciprocating piston pump in a well. It is used to mechanically lift liquid, such as oil, out of the well if there is not enough bottom hole or formation pressure for forcing the liquid to flow up to the surface. Pump jacks are commonly used for onshore wells. A pump jack converts the rotary mechanism of a drive motor to a vertical reciprocating motion to drive the pump shaft and displays a characteristic nodding motion.

Modern pump jacks are powered by a prime mover, which commonly comprises an electric motor. The prime mover runs a set of pulleys that, in turn, drive a pair of cranks, generally fitted with counterweights to assist the motor in lifting the heavy string of the rod line running into the ground. The cranks raise and lower one end of a beam, which is free to move on an A-shaped frame. On the other end of the beam is a "donkey-head", so named due to its appearance. The donkey-head moves up and down as the cranks rotate.

An induction or asynchronous motor is an alternating current ("AC") motor in which all electromagnetic energy is transferred by inductive coupling from a primary winding to a secondary winding, the two windings separated by an air gap. In both induction and synchronous motors, the AC power supplied to a stator disposed in the motor creates a magnetic field that rotates in time with the frequency of the AC power. A synchronous motor's rotor turns at the same rate as the stator field. In contrast, an induction motor's rotor rotates at a slower speed than the stator field. The induction motor stator's magnetic field is, therefore, changing or rotating relative to the rotor. This induces an opposing current in the induction motor's rotor, in effect, the motor's secondary winding when the latter is short-circuited or closed through an external impedance. The rotating magnetic flux induces currents in the rotor windings in a manner similar to currents induced in a transformer's secondary windings. These currents, in turn, create magnetic fields in the rotor that react against the stator field. Due to Lenz's Law, the direction of the magnetic field created will be such as to oppose the change in current through the windings. The cause of the induced current in the rotor windings is the rotating stator magnetic field, so to oppose this effect the rotor will start to rotate in the direction of the rotating stator magnetic field. The rotor accelerates until the magnitude of the induced rotor winding current and torque balances the applied load. Since rotation at synchronous speed would result in no induced rotor current, an induction motor always operates slower than synchronous speed.

For the motor to run, the speed of the physical rotor must be lower than that of the stator's rotating magnetic field (ns), or the magnetic field would not be moving relative to the rotor conductors and no currents would be induced. As the speed of the rotor drops below synchronous speed, the rotation rate of the magnetic field in the rotor increases, inducing more current in the windings and creating more torque. The ratio between the rotation rate of the magnetic field, as seen by the rotor (slip speed), and the rotation rate of the stator's rotating field is called "slip". Under load, the speed drops and the slip can increase enough to create sufficient torque to turn the load. For this reason, induction motors are sometimes referred to as asynchronous motors. An induction motor can be used as an induction generator by running the motor at a speed higher than the synchronous speed of the stator magnetic field. In other words, by running the motor at negative slip.

Slip, s, is defined as the difference between synchronous speed and operating speed, at the same frequency, expressed in revolutions per minute ("RPM"), or in percent or ration of synchronous speed. Thus:

$$s = \frac{\eta_s - \eta_r}{\eta_s}$$

where $\eta_s$ is the synchronous speed of the stator magnetic field; and $\eta_r$ is the rotor mechanical speed.

Therefore, as the motor operates to lift the donkey-head, the motor consumes electrical power from an electrical power grid. In doing so, potential energy is created in lifting the donkey-head. As the donkey-head falls, the potential energy can be converted to kinetic energy as the motor can operate as a generator to generate electricity. This generated electricity can be put back onto the electrical power grid.

Underwriters Laboratories standard no. UL1741 is an accepted standard for grid interconnection with an electrical utility for inverter-based micro-generation technology, such as used in wind-generated electricity technology.

U.S. Pat. No. 10,250,168 issued to the Applicant discloses a pump jack controller that export electricity generated by a pump jack motor to an electric power grid. What is not known in the prior art, however, is a system and method to utilize the electricity generated by one of a plurality of pump jacks located at a common site to at least partially power other pump jacks at the common site to minimize the overall draw of electricity from an electric power grid.

It is, therefore, desirable to provide a pump jack controller system and method to harness the potential energy generated in operating a pump jack and convert that potential energy into electricity that can be used to at least partially power other pump jacks.

SUMMARY

In some embodiments, a pump jack controller is provided that can harness the potential energy created in operating a pump jack into AC electric power that can be put back onto an AC electric grid such that the pump jack can operate as a micro electric generator.

Broadly stated, in some embodiments, a pump jack controller can be provided for converting waste energy created during the operation of one of a plurality of pump jacks into electrical energy that is then supplied back to other pump jacks of the plurality of pump jacks, each of the plurality of pump jacks operatively coupled to and operated by an electric motor, each of the plurality of pump jacks comprising a donkey-head and a counterweight operatively coupled thereto wherein each of the donkey-head and the counterweight rise and fall when each pump jack is operated by their electric motor, the pump jack controller system comprising: a plurality of motor drive units ("MDU"), one for each of the plurality of pump jacks, each MDU comprising a direct current ("DC") input and an alternating current ("AC") output, the AC output operatively coupled to one of the electric motors, the MDU configured to invert DC power supplied to the DC input into AC power that is outputted from the AC output to power the electric motor, the MDU further configured to rectify AC electric power generated by the electric motor into generated DC power that is outputted from the DC input when either of the donkey-head and the counterweight is falling thereby causing the motor to be in a negative torque operating condition; a DC bus operatively coupled to the DC input of each of the plurality of MDUs; and a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU configured to regulate and maintain a pre-set DC bus value on the DC bus, the GDU further configured to invert the generated DC power into generated AC power that is outputted from the AC input back to the power grid when the generated DC power supplied to the DC bus by the MDU exceeds the pre-set DC bus value.

Broadly stated, in some embodiments, a method can be provided for converting waste energy created during the operation of one of a plurality of pump jacks into electrical energy that is then supplied to other pump jacks of the plurality of pump jacks, each of the plurality of pump jacks operatively coupled to and operated by an electric motor, each of the plurality of pump jacks comprising a donkey-head and a counterweight operatively coupled thereto wherein each of the donkey-head and the counterweight rise and fall when each pump jack is operated by the electric motor, the method comprising the steps of: receiving a pump jack controller system and operatively coupling the system to the plurality of pump jacks, the system further comprising: a plurality of motor drive units ("MDU"), one for each of the plurality of pump jacks, each MDU comprising a direct current ("DC") input and an alternating current ("AC") output, the AC output operatively coupled to one of the electric motors, the MDU configured to invert DC power supplied to the DC input into AC power that is outputted from the AC output to power the electric motor, the MDU further configured to rectify AC electric power generated by the electric motor into generated DC power that is outputted from the DC input when either of the donkey-head and the counterweight is falling thereby causing the motor to be in a negative torque operating condition, a DC bus operatively coupled to the DC input of each of the plurality of MDUs, and a generator drive unit ("GDU") comprising a DC output and an AC input, the DC output operatively coupled to the DC bus, the GDU configured to rectify a source of supplied AC electric power from the power grid coupled to the AC input into DC power that is outputted onto the DC bus, the GDU configured to regulate and maintain a pre-set DC bus value on the DC bus, the GDU further configured to invert the generated DC power into generated AC power that is outputted from the AC input back to the power grid when the generated DC power supplied to the DC bus by the MDU exceeds the pre-set DC bus value; supplying the source of supplied AC electric power to the system to power the electric motors to operate the plurality of pump jacks; producing generated DC power with the electric motors when one or more of the electric motors is in a negative torque condition when either of the donkey-head and the counterweight is falling, wherein the generated DC power is outputted from the DC input of the MDU associated with the electric motor that is in the negative torque condition onto the DC bus; and powering one or more of the plurality of pump jacks with the generated DC power when the generated DC power comprises a DC voltage that exceeds the pre-set DC bus value.

Broadly stated, in some embodiments, the controller can further comprise a low-pass filter unit disposed between the AC input of the GDU and the source of supplied AC electric power.

Broadly stated, in some embodiments, a pump jack controller system can be provided for converting waste energy created during the operation of one of a plurality of pump jacks into electrical energy that is then supplied back to other pump jacks of the plurality of pump jacks, each of the plurality of pump jacks operatively coupled to and operated by an electric motor, each of the plurality of pump jacks comprising a donkey-head and a counterweight operatively coupled thereto wherein each of the donkey-head and the counterweight rise and fall when each pump jack is operated by their electric motor, the pump jack controller system comprising: a plurality of motor drive units ("MDU"), one for each of the plurality of pump jacks, each MDU comprising a direct current ("DC") input and an alternating current ("AC") output, the AC output operatively coupled to one of the electric motors, the MDU configured to invert DC power supplied to the DC input into AC power that is outputted from the AC output to power the electric motor, the MDU further configured to rectify AC electric power generated by the electric motor into generated DC power that is outputted from the DC input when either of the donkey-head and the counterweight is falling thereby causing the motor to be in a negative torque operating condition; a DC bus operatively coupled to the DC input of each of the plurality of MDUs; and a rectifier unit comprising a DC output and an AC input, the DC output operatively coupled to the DC bus, the rectifier unit configured to rectify a source of supplied AC electric power from the power grid coupled to the AC input into DC power that is outputted onto the DC bus.

Broadly stated, in some embodiments, the system can further comprise a brake chopping unit ("BCU") operatively coupled to the DC bus, the BCU configured to operatively couple a braking resistor to the DC bus when voltage on the DC bus exceeds a pre-set DC bus value.

Broadly stated, in some embodiments, a method can be provided for converting waste energy created during the operation of one of a plurality of pump jacks into electrical energy that is then supplied to other pump jacks of the plurality of pump jacks, each of the plurality of pump jacks operatively coupled to and operated by an electric motor, each of the plurality of pump jacks comprising a donkey-head and a counterweight operatively coupled thereto wherein each of the donkey-head and the counterweight rise and fall when each pump jack is operated by the electric motor, the method comprising the steps of: receiving a pump jack controller system and operatively coupling the system to the plurality of pump jacks, the system further comprising: a plurality of motor drive units ("MDU"), one for each of the plurality of pump jacks, each MDU comprising a direct current ("DC") input and an alternating current ("AC") output, the AC output operatively coupled to one of the electric motors, the MDU configured to invert DC power supplied to the DC input into AC power that is outputted from the AC output to power the electric motor, the MDU further configured to rectify AC electric power generated by the electric motor into generated DC power that is outputted from the DC input when either of the donkey-head and the counterweight is falling thereby causing the motor to be in a negative torque operating condition, a DC bus operatively coupled to the DC input of each of the plurality of MDUs, and a rectifier unit comprising a DC output and an AC input, the DC output operatively coupled to the DC bus, the rectifier unit configured to rectify a source of supplied AC electric power from the power grid coupled to the AC input into DC power that is outputted onto the DC bus; supplying the source of supplied AC electric power to the system to power the electric motors to operate the plurality of pump jacks; producing generated DC power with the electric motors when one or more of the electric motors is in a negative torque condition when either of the donkey-head and the counterweight is falling, wherein the generated DC power is outputted from the DC input of the MDU associated with the electric motor that is in the negative torque condition onto the DC bus; and powering one or more of the plurality of pump jacks with the generated DC power.

Broadly stated, the method can further comprise operatively coupling a brake chopping unit ("BCU") to the DC bus when voltage on the DC bus exceeds a pre-set DC bus value.

Broadly stated, in some embodiments, each of the plurality of MDUs can further comprise a first inverter-based motor drive unit.

Broadly stated, in some embodiments, the DC bus can comprise a filter capacitor.

Broadly stated, in some embodiments, the GDU can comprise a second inverter-based motor drive unit.

Broadly stated, in some embodiments, the source of supplied AC electric power can be connected to the electric power grid.

Broadly stated, in some embodiments, the source of supplied AC electric power can comprise 3-phase AC electric power.

Broadly stated, in some embodiments, the pre-set DC bus value can be in excess of a root-mean-square voltage value of the supplied AC electric power multiplied by the square root of 2.

Broadly stated, in some embodiments, the GDU can further comprise a PID control for regulating and maintaining the pre-set DC bus value on the DC bus.

Broadly stated, in some embodiments, the electric motor can comprise an asynchronous or induction electric motor.

Broadly stated, in some embodiments, the electric motor can comprise a synchronous or permanent magnet electric motor.

BRIEF DESCRIPTION OF THE DRAWINGS

FIG. 12 is a table depicting data collected during the operation of the pump jacks powered by variable frequency drive systems shown in FIG. 9, across the line starting systems shown in FIG. 10 and the controller shown in FIG. 11.

DETAILED DESCRIPTION

In some embodiments, a pump jack controller is provided that can harness the potential energy created in operating a pump jack into AC electric power that can be put back onto an AC electric grid such that the pump jack can operate as a micro electric generator.

Figure 1:
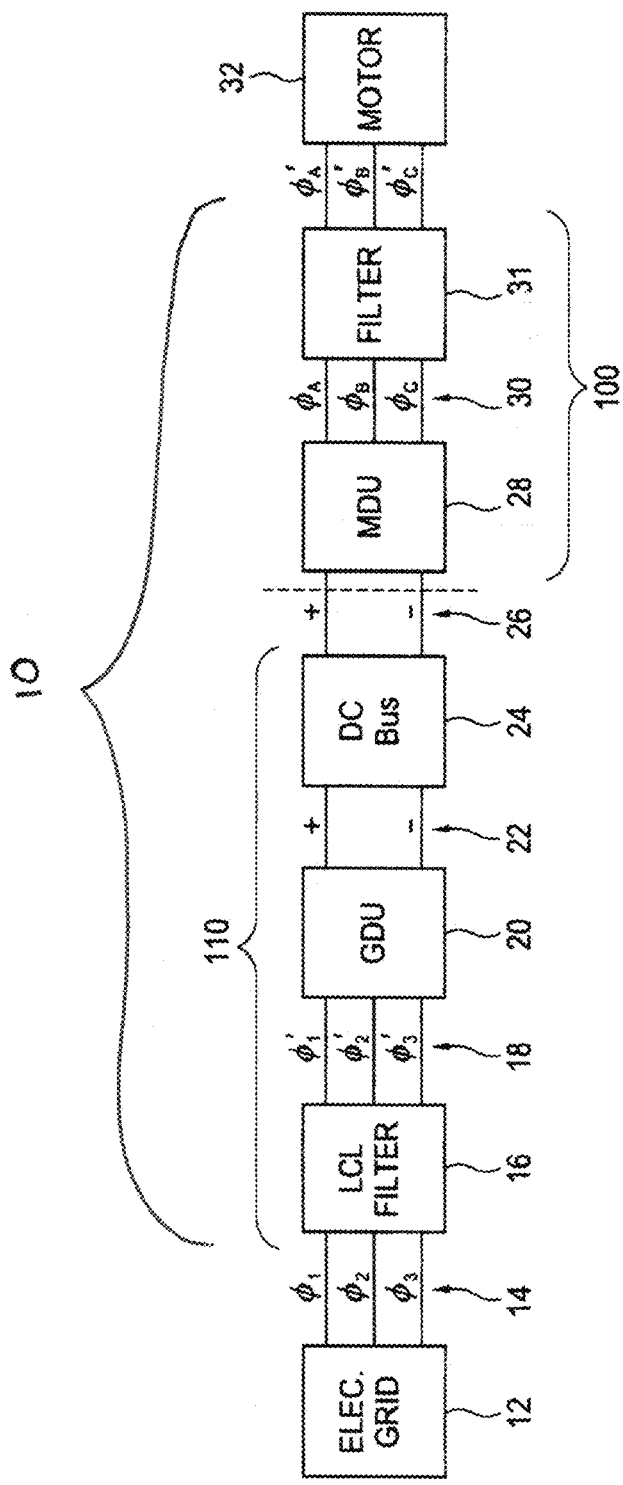
FIG. 1 is a block diagram depicting one embodiment of a controller for use with a pump jack.

Referring to FIG. 1, a block diagram of one embodiment of pump controller 10 is shown. In some embodiments, controller 10 can be connected to alternating current ("AC") electric power grid 12 via electric connections 14. In this illustration, connections 14 represent a 3-phase AC electric power connection, as well known to those skilled in the art although it is equally obvious to those skilled in the art that a single phase power connection or a poly-phase power connection can be substituted.

Figure 4:
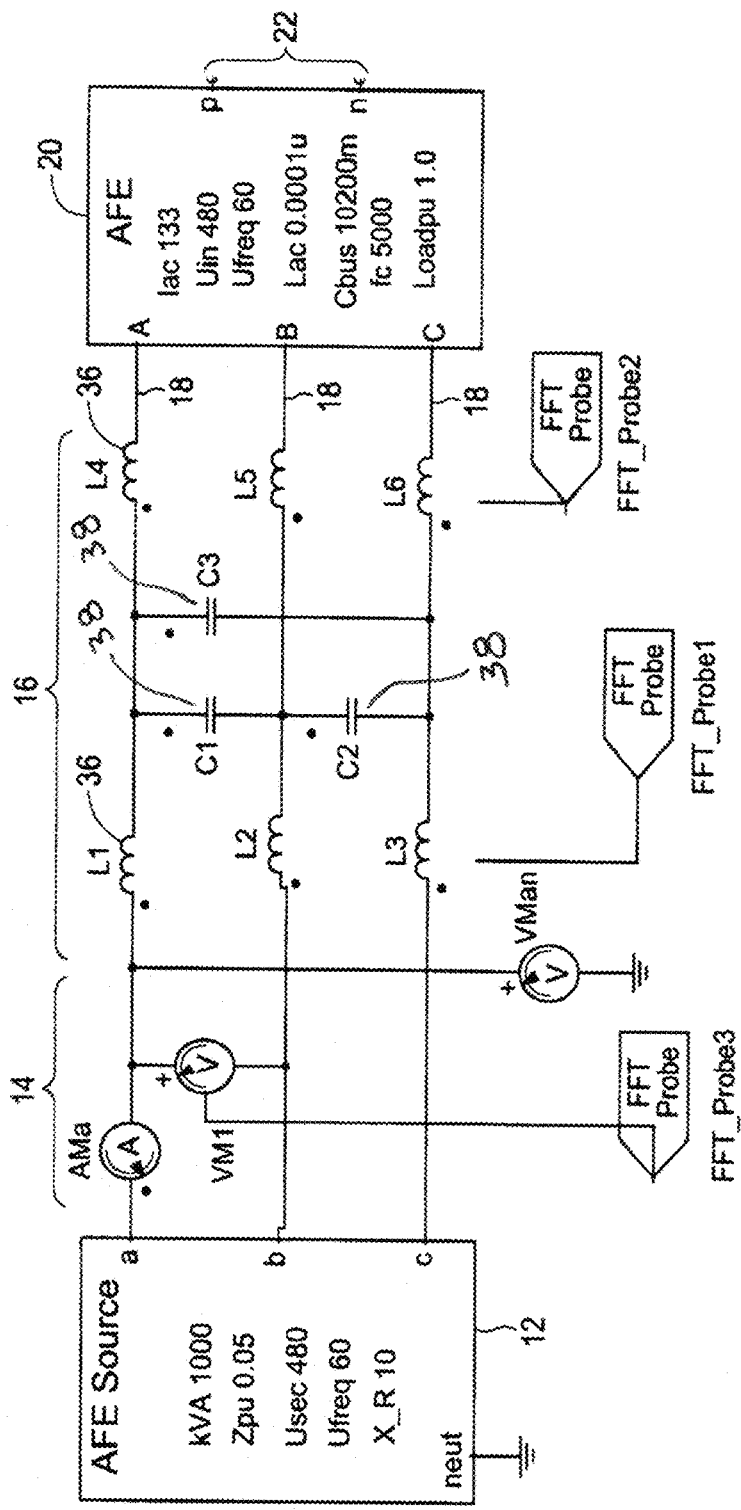
FIG. 4 is an electrical circuit schematic depicting a general circuit model of the controller of FIG. 1 including an Active Front End.

In some embodiments, controller 10 can comprise low pass filter unit 16 further comprising a first port and a second port. The first port can be operatively coupled to electric connections 14. In some embodiments, filter unit 16 can comprise a third-order low-pass filter further comprising an inductor-capacitor-inductor configuration as well known to those skilled in the art. Filter unit 16 is shown in more detail in FIG. 4. In a representative embodiment, inductors 36 can comprise an inductance value in the range of 0.11 to 5.2 mH, and capacitors 38 (also labelled as C1, C2 and C3) can comprise a capacitance value in the range of 1.5 to 192 µF. The values of inductors 36 and capacitors 38 can also be selected by those skilled in the art, depending on the size of motor 32 to be controlled by controller 10. In some embodiments, controller 10 can be configured to operate electric motors producing power in the range of 5 to 700 horsepower. Filter unit 16 has specific heat dissipation characteristics, in the range of 70 to 1650 watts so as to maintain temperature stability within 4° C. of ambient temperature.

In some embodiments, pump controller 10 can comprise front end 110, which can further comprise of filter unit 16, GDU 20 and DC bus 24. Pump controller 10 can further comprise motor controller system 100 that can further comprise MDU 28 supplying AC power to filter reactor 31 over power connections 30.

Figure 2:
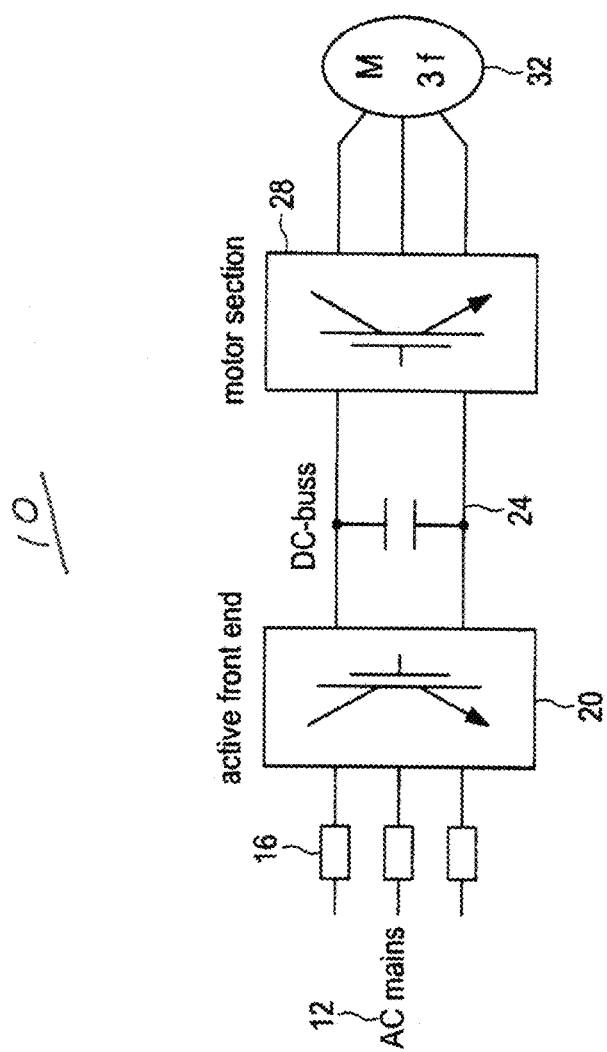
FIG. 2 is a simplified block diagram depicting the controller of FIG. 1.

Referring to FIGS. 1 and 2, the second port of filter unit 16 can be connected to generator drive unit ("GDU") 20 via electrical connections 18. In some embodiments, GDU 20 can comprise an inverter-based motor drive unit that can be used to rectify a source of supplied AC electric power, such as from electric grid 12, into DC power. For the purposes of this specification, GDU 20 is also referred to as an "Active Front End" or "AFE".

Figure 5:
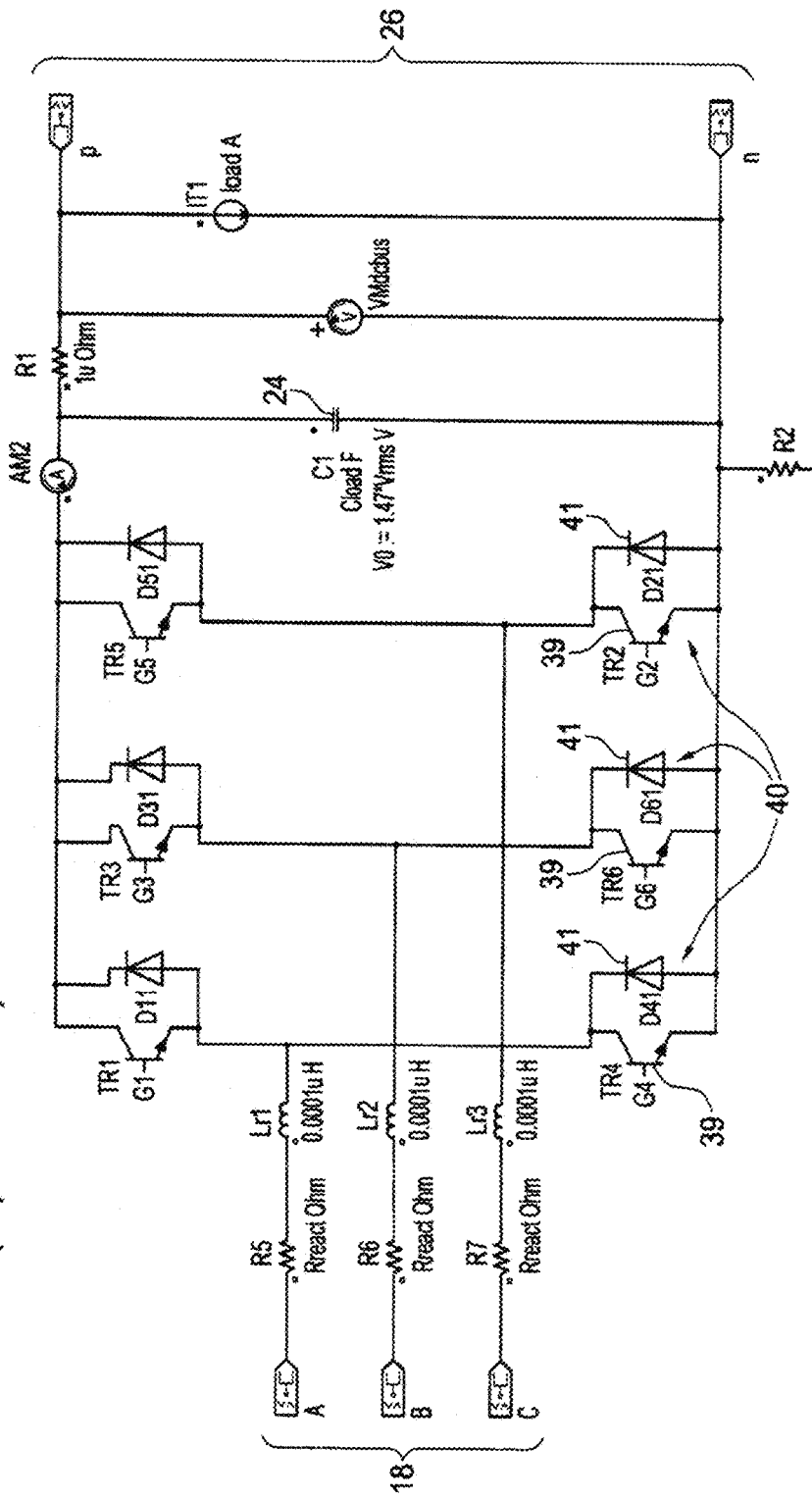
FIG. 5 is an electrical circuit schematic depicting the Active Front End of FIG. 4.

As shown in FIG. 5, GDU 20 can comprise a number of switching devices 40 configured to invert DC power into AC power, as known to those skilled in the art. Each device 40 can comprise a solid-state device 39 bypassed by a diode 41. Solid-state devices 39 can comprise any suitable device for providing an electrical switching function such as transistors, field effect transistors ("FETs"), MOSFETs, insulated gate bipolar transistors ("IGBTs"), silicon-controlled rectifiers ("SCRs"), triacs or any other equivalent functioning solid-state device as known to those skilled in the art. By operating GDU 20 "in reverse", that is, supplying the source of supplied AC electric power to AC output connections of a motor drive unit, diodes 41 can rectify the supplied AC electric power into DC power that can be outputted from the DC input of the motor drive unit. In a representative embodiment, GDU can include a motor drive unit as manufactured by Elettronica Santerno Spa of Castel Guelfo, ITALY, model no. SINUS PENTA 0005 thru 0524.

Referring back to FIG. 1, GDU 20 can be coupled to DC bus 24 via DC power connections 22. In some embodiments, DC bus 24 can comprise a filter capacitor as shown in FIG. 5. In some embodiments, the filter capacitor can comprise a capacitance value in the range of 3,300 to 40,000 µF. The capacitance value of the capacitor disposed in DC bus 24 can depend on the size of motor 32 being controlled by controller 10. In some embodiments, the capacitance value can increase as the size of motor 32 increases.

In some embodiments, DC bus 24 can be connected to motor drive unit ("MDU") 28 via DC power connections 26. Similar to GDU 20, MDU 28 can comprise an inverter-based motor drive unit. In some embodiments, MDU 28 can comprise the same motor drive unit as disposed in GDU 20. MDU 28 is configured to be fed by the DC bus 24 of GDU 20. GDU 20 is setup with a PID control to regulate and maintain a pre-set DC bus value. This DC bus value is considered a setpoint DC value calculated as a value in excess of the root-mean-square ("RMS") voltage value of the AC electric power supplied to GDU 20 multiplied by the square root of two.

In some embodiments, MDU 28 can be connected to motor 32 via AC power connections 30. In some embodiments, motor 32 can comprise an induction or asynchronous electric motor. In other embodiments, motor 32 can comprise a synchronous or permanent magnet electric motor in substitution of an asynchronous or induction electric motor. In some embodiments, controller 10 can further comprise reactor filter 31 disposed between MDU 28 and motor 32 to provide low-pass filtering of the AC power supplied to motor 32, as well known to those skilled in the art.

Figure 3:
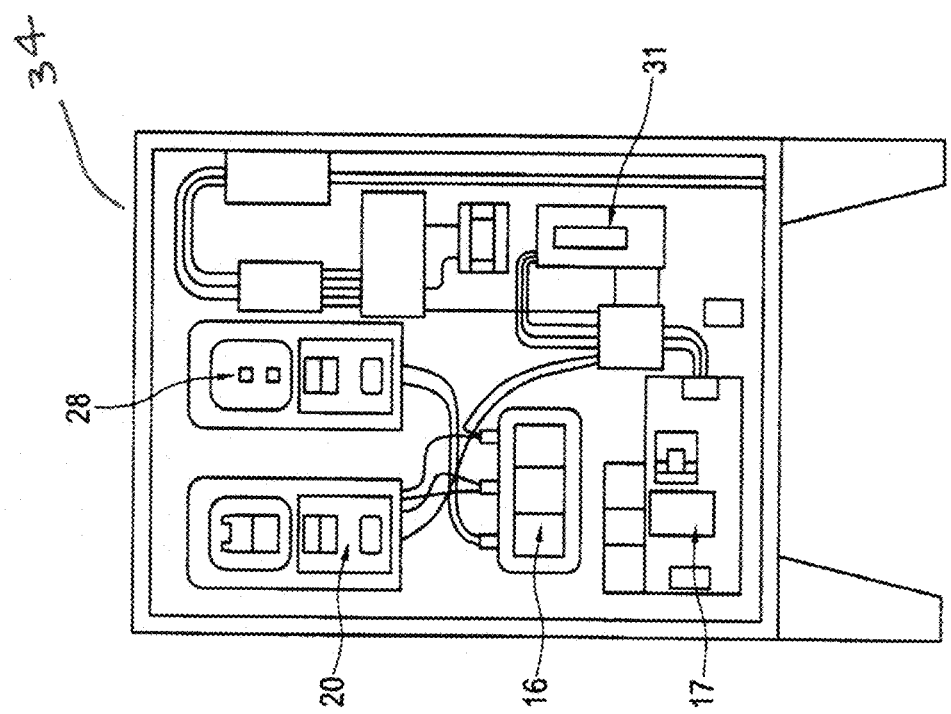
FIG. 3 is a front elevation view depicting the controller of FIG. 1 installed in a cabinet.

Referring to FIG. 3, one embodiment of controller 10 is shown installed in cabinet 34, including GDU 20, MDU 28, filter unit 16 (including generative interface 17) and filter reactor 31.

Figure 6:
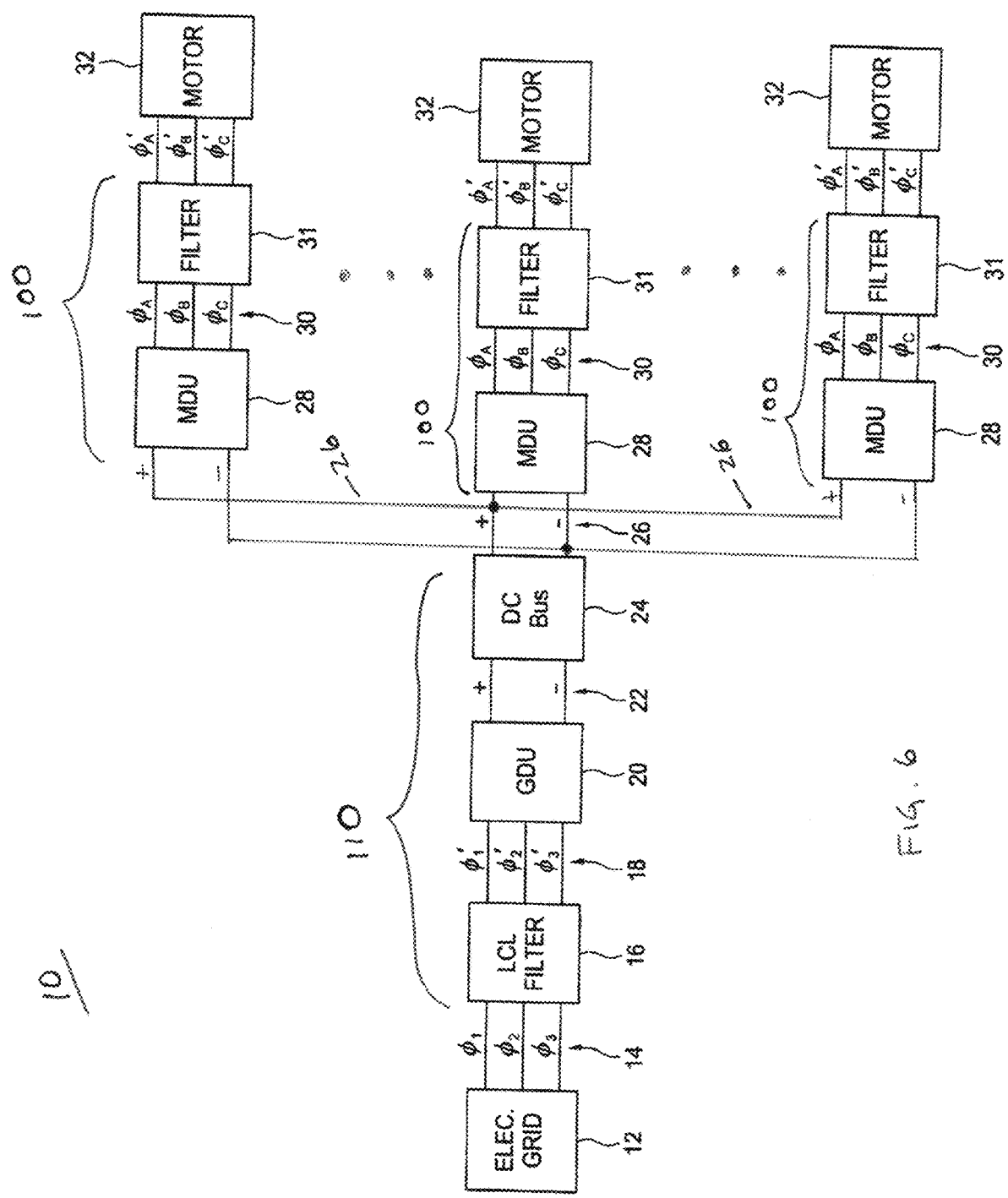
FIG. 6 is a block diagram depicting a second embodiment of the controller of FIG. 1 for use with a plurality of pump jacks.

Referring to FIG. 6, another embodiment of controller 10 is shown. In some embodiments, controller 10 can comprise of front end 110 operatively coupled to electric power grid 12, wherein DC bus 24 can be operatively coupled to a plurality of motor controller systems 100, each of which provides electric power to a pump jack motor 32, via DC power connections 26 from DC bus 24 to the MDU 28 of each motor controller system 100.

Figure 7A:
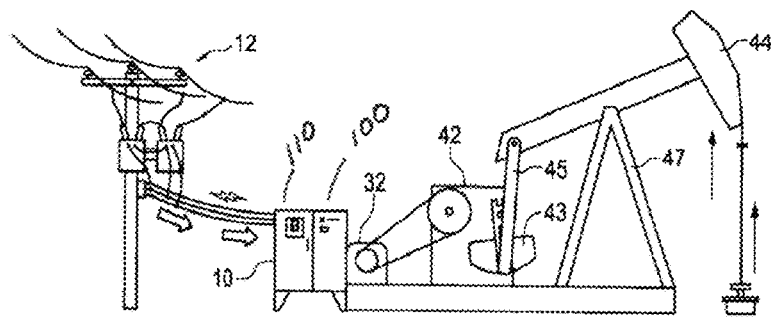
FIG. 7a is a block diagram depicting a pump jack in operation with the controller of FIG. 1.

Referring to FIG. 7a, pump jack 42 is shown being operated by motor 32, which is controlled by controller 10 supplied by power from electric grid 12. As well known to those skilled in the art, pump jack 42 comprises donkey-head 44 pivotally attached to support frame 47, wherein donkey-head 44 is operatively coupled to counterweight 43 via connecting rod 45. In FIG. 7a, motor 32 is operating to rotate counterweight 43 downward which, in turn, raises donkey-head 44 upward as it pivots on supporting frame 47.

Figure 7B:
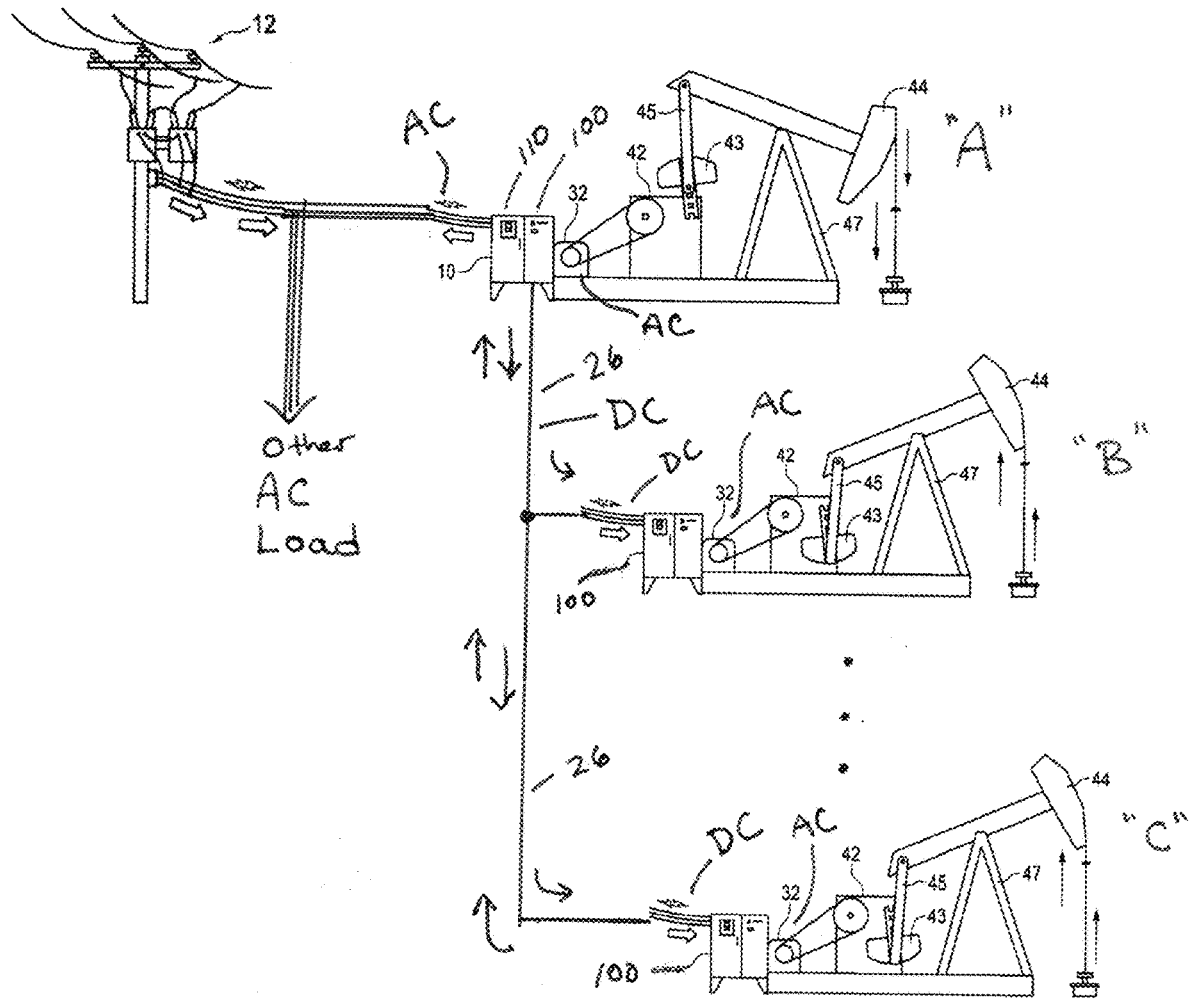
FIG. 7b is a block diagrams depicting a plurality of pump jacks in operation with the controller of FIG. 6.

In FIG. 7b, motor 32 of pump jack labelled "A" operates to rotate counterweight 43 upwards which, in turn, lowers donkey-head 44 downwards. Depending on the conditions of the well and the type of oil (light or heavy) being extracted, motor 32 can be placed in an "over-speed" or "negative torque" operating condition when donkey-head 44 is falling or when counterweight 43 is falling. In other words, either of donkey-head 44 or counterweight 43 falling can cause an over-speed condition in motor 32 depending on whether pump jack 42 is pump heavy or counterweight heavy, respectively. In either case, the energy expended or released by donkey-head 44 or counterweight 43 falling is energy that is otherwise wasted. It is when motor 32 is operating in an over-speed condition caused by the release of this waste energy that motor 32 can operate as a generator. As motor 32 operates as an AC power generator, MDU 28 can rectify the AC power generated by motor 32 into generated DC power that can be outputted onto DC bus 24. When the DC voltage of the generated DC power rises above a predetermined set point or threshold, the generated DC power can then be used to supply DC power to pump jacks labelled "B" and "C" via DC power connections 26. In this situation, the generated DC power can be used to offset and/or reduce the amount of electric AC power drawn from electric grid 12 that otherwise would be needed but for the generated DC power generated by one or more pump jack operatively coupled to a plurality of pump jacks. As a result, when a plurality of pump jacks each having motor controller systems 100 operatively coupled to a common DC bus to provide DC power to the MDU 28 of each pump jack, DC power generated by a pump jack operating in an "over-speed" or "negative torque" operating condition can provide DC power to other pump jacks resulting in a reduced combined AC power draw from electric grid 12 and, thus, reducing the cost of the electric power operating costs of the plurality of pump jacks.

Field Trial Results

Referring to FIGS. 8 to 13, one embodiment of controller 10 was tested in a field trial using three FL6 pump jacks, each powered by a 50 horsepower NEMA induction electric motor. In the field trial, the operation of controller 10 was compared to two prior art methods: powering each pump jack with a variable frequency drive ("VFD") system, referred to as "Step 1" in the following disclosure; and powering the pump jacks with across the line starting systems, referred to as "Step 2" in the following disclosure. The operation of controller 10 with the pump jacks in the field is referred to as "Step 3" in the following disclosure.

Figure 8:
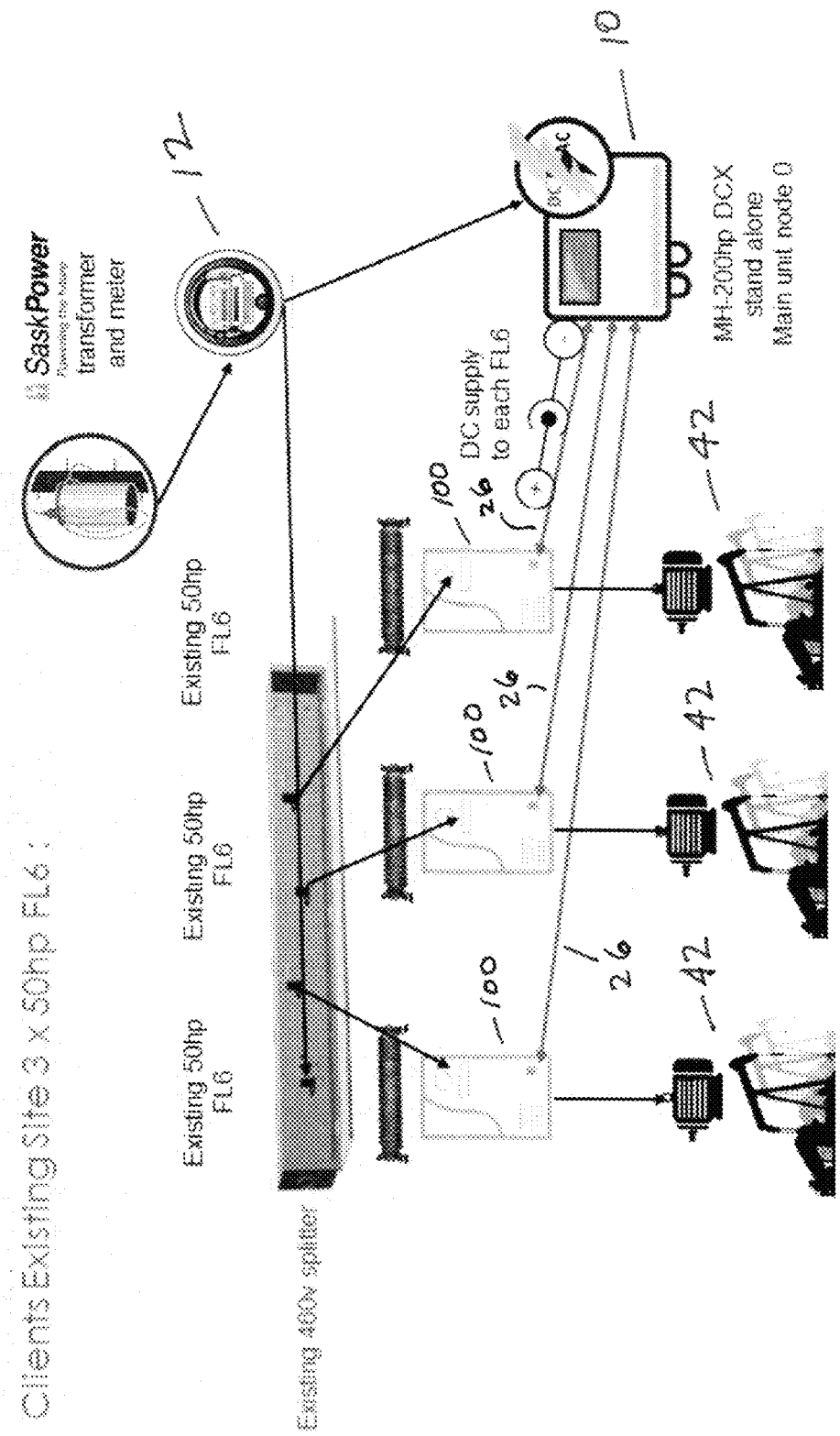
FIG. 8 is a block diagram depicting one embodiment of the controller of FIG. 6 in a field trial using three 50 horsepower FL6 pump jacks.
Figure 9:
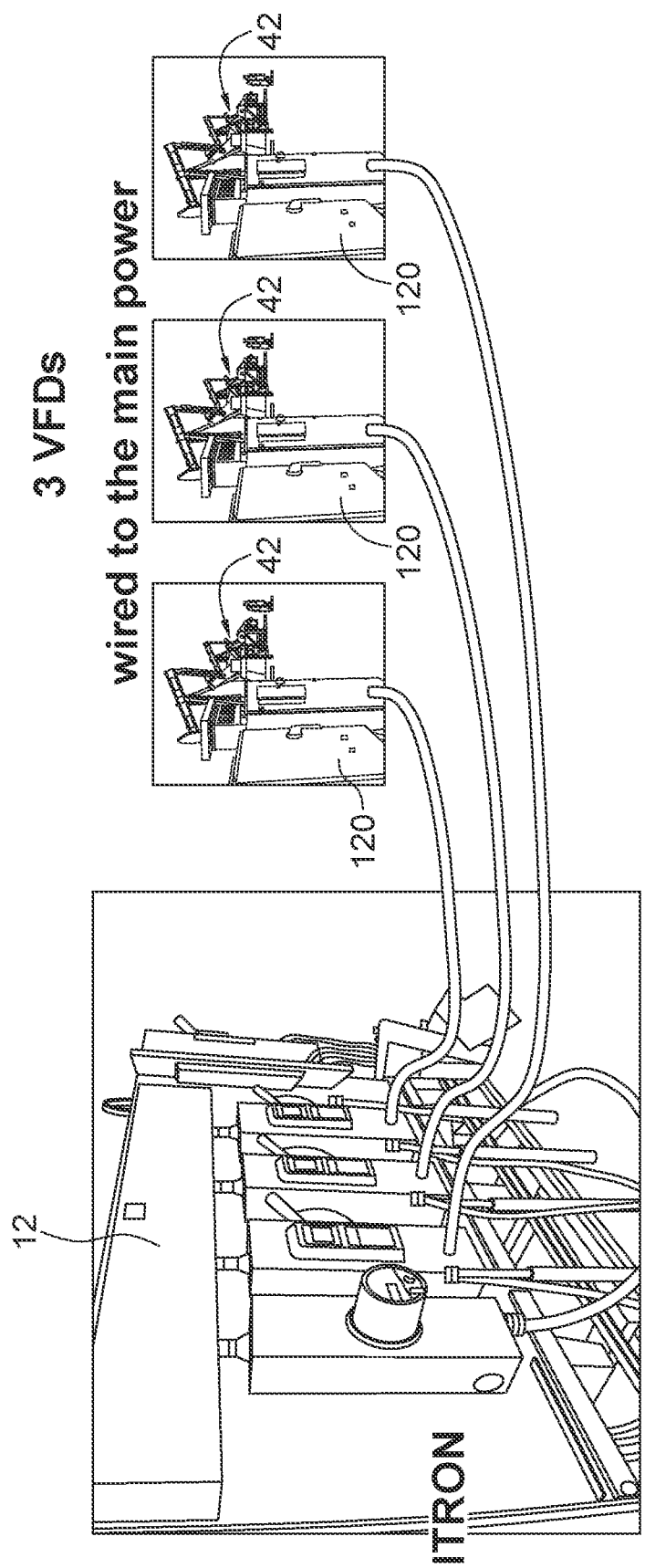
FIG. 9 is a block diagram depicting the three pump jacks of FIG. 8 powered by variable frequency drive systems.
Figure 10:
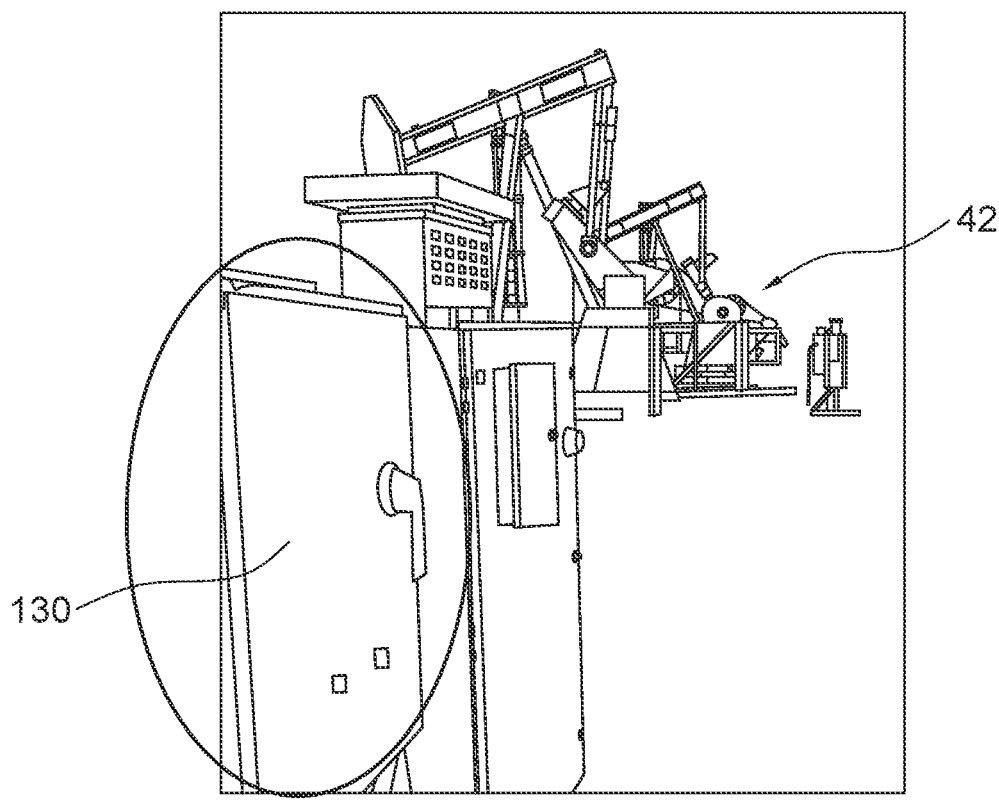
FIG. 10 is a block diagram depicting the three pump jacks of FIG. 8 powered by across the line starting systems.
Figure 10:
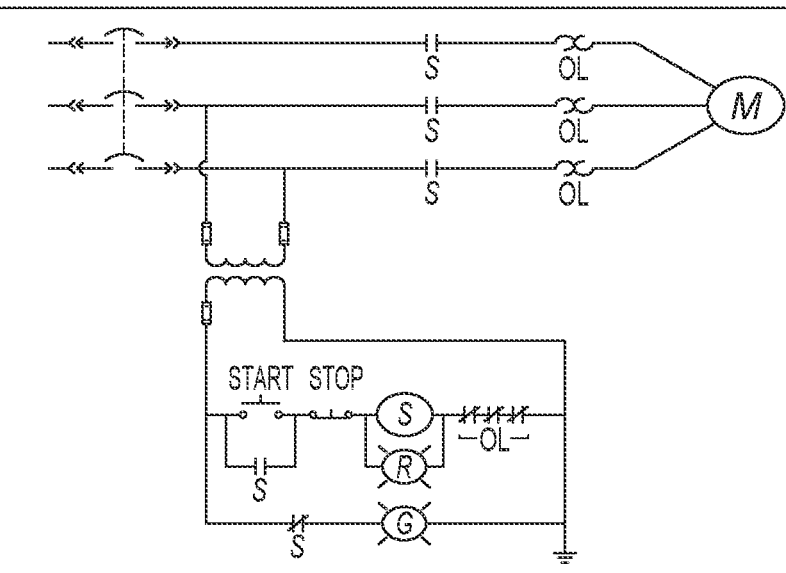
Figure 11:
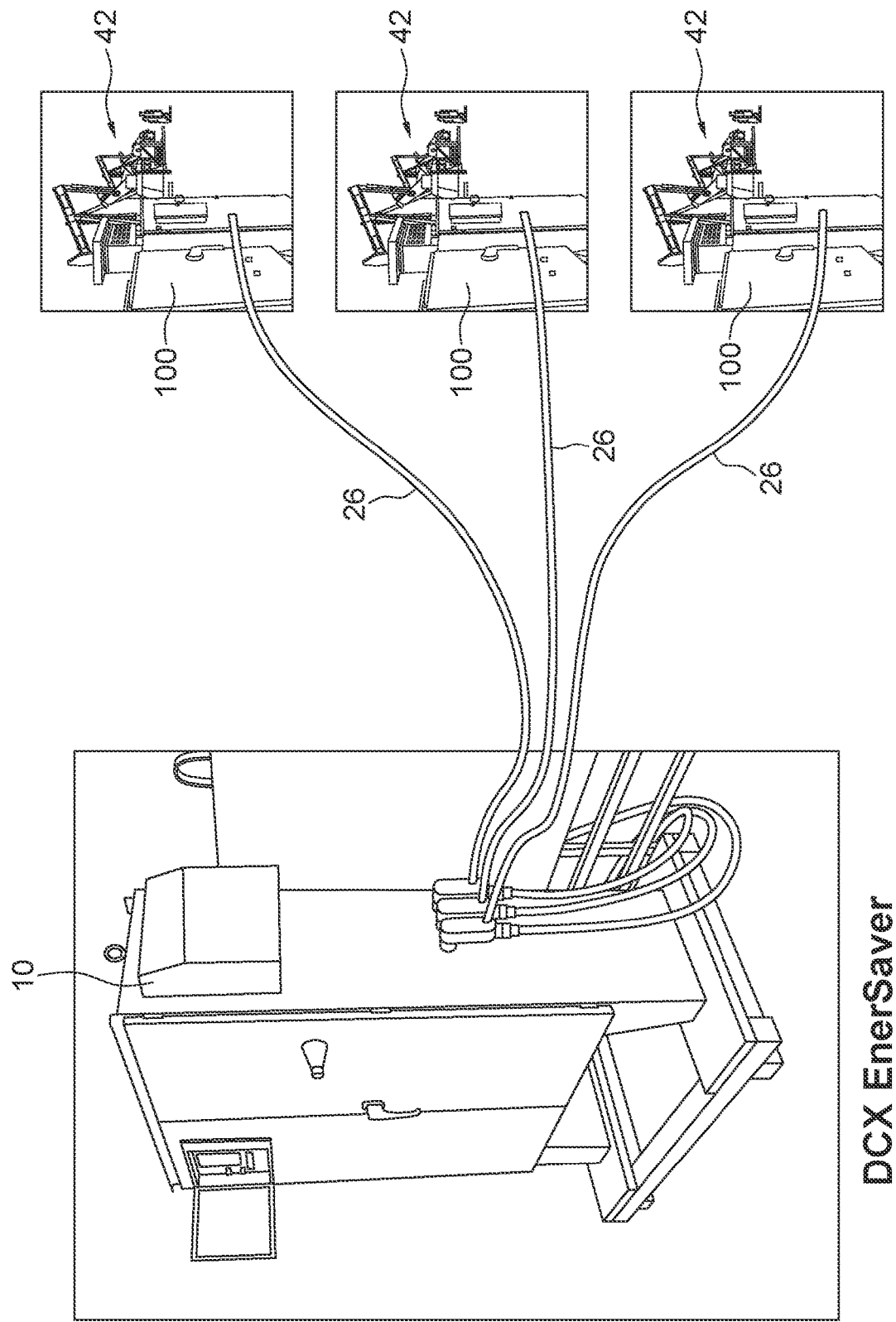
FIG. 11 is a block diagram depicting the three pump jacks of FIG. 8 powered by the controller of FIG. 6.

FIG. 8 is a block diagram illustrating how controller 10 was configured with the electric grid and the pump jacks in the field trial. FIG. 9 illustrates Step 1 of the field trial, wherein each pump jack 42 is powered by VFD unit 120, as well known to those skilled in the art. FIG. 10 illustrates Step 2 of the field trial, wherein each pump jack 42 is powered by across the line starter 130, as well known to those skilled in the art. The objective of the field trial was to perform a controlled energy usage study to compare these three types of powering schemes directly to a power utility (SaskPower) billing metrics and power usage recording methodology. For Step 1, using VFDs to power the pump jacks, the strokes per minute ("SPM") production speed of each pump jack was set to the required production rate for the site, which was maintained across all three steps of the field trial. For Step 2, the motor for each pump jack was re-sheaved as close as possible to match the SPM rate of Step 1. For Step 3, controller 10 was introduced to operate the VFDs to power the pump jacks. An Itron® Sentinel® model SS4SL power meter was used to acquire the electrical power usage data for the field data. This power meter is Measurement Canada approved and is a utility-grade, four-quadrant power meter as used by SaskPower to measure power usage by its customers in the Province of Saskatchewan in Canada.

The scope of the field trial proceeded based on the following steps:
1. Install a provisioned and calibrated Itron® power meter.
2. Verify production of a candidate well site pad that is consistent for a 30 to 40 day trial period.
3. Validate what a correct SPM rate applicable for the trial.
4. Arrange for the 3-step sections of pump jack speed control of:
   a. Step 1—VFDs only; set the SPM
   b. Step 2—Across the line starter; motors sheaved to match Step 1 SPM
   c. Step 3—Install controller 10; re-sheave motors back to Step 1 VFD SPM rate and run the VFD at the same SPM as Step 1
5. Once the Itron Meter® is installed, poll with the Itron® data acquisition software to validate all parameters are operational and the Itron® meter is operational and error-free
6. Start the power study
7. Once Step 3 has run for the set amount of time (6 days), poll the Itron® meter with the Itron data acquisition software and export the data to evaluate the operation performance, modelling and return on investment payback.

Figure 12:
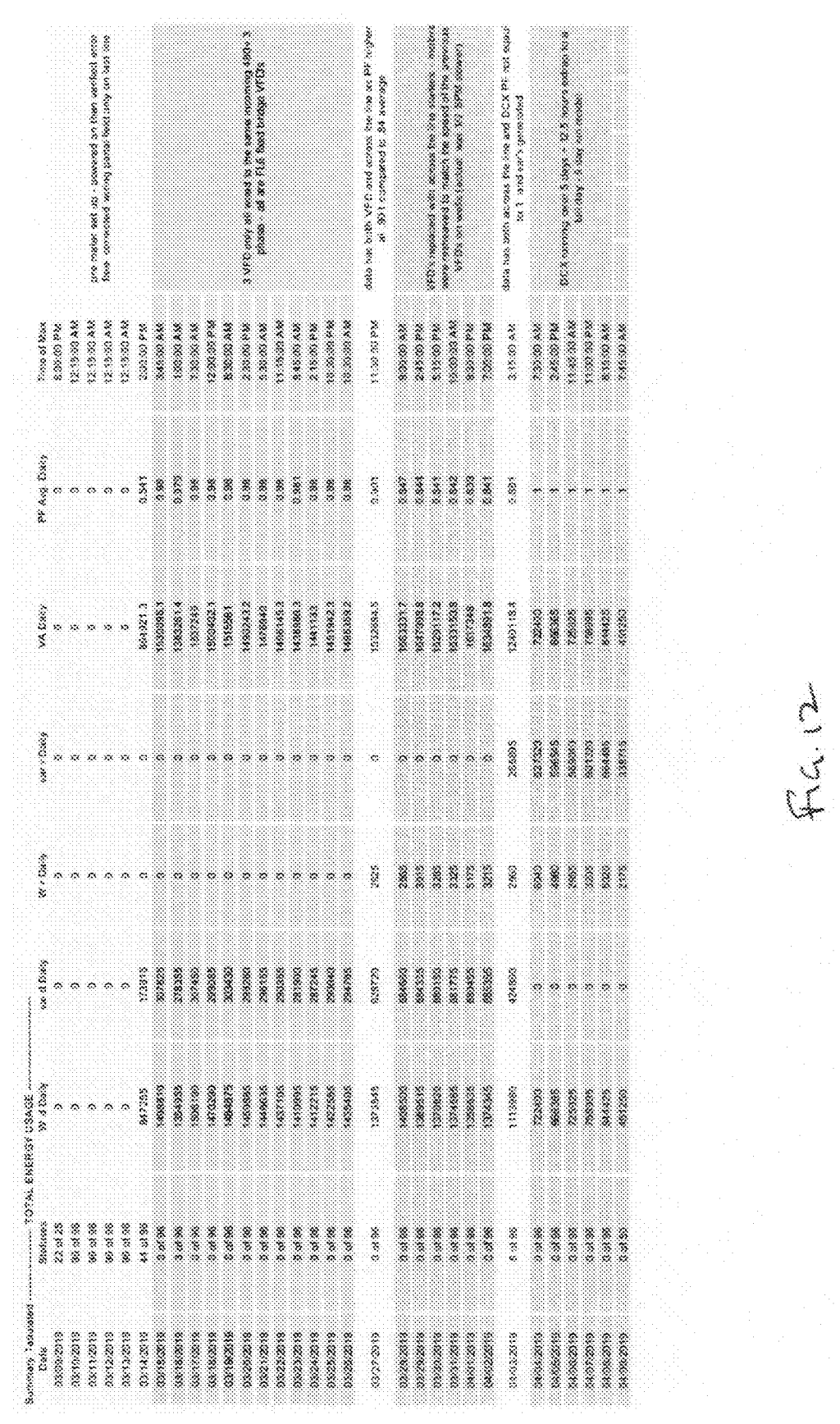
Figure 13:
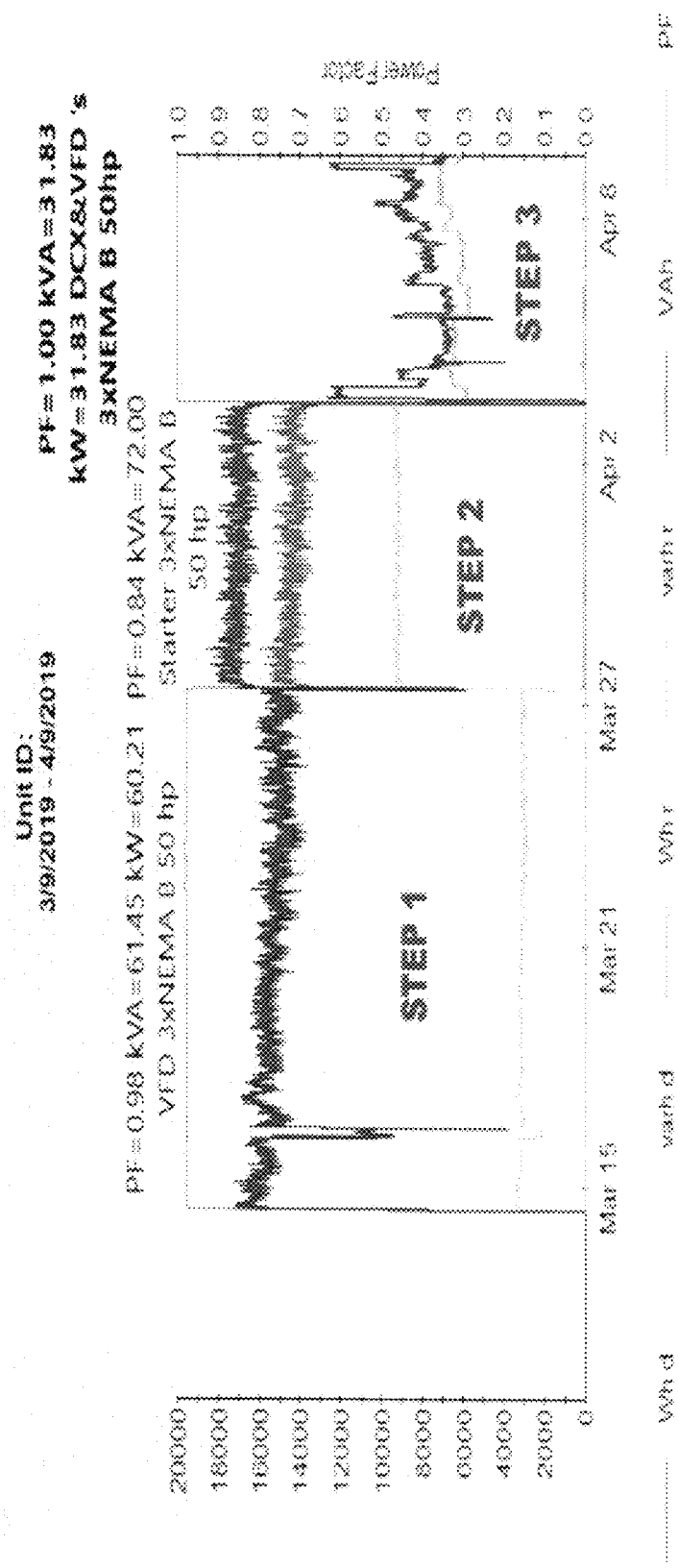
FIG. 13 is an X-Y graph depicting the data of FIG. 12.

The field trial commenced on Mar. 9, 2019 and finished on Apr. 9, 2019. Referring to FIG. 12, a table of the power data collected from the Itron® power meter is shown for all three Steps of the field trial. An X-Y graph comparing the collected data of the three Steps over the time period of the trial is shown in FIG. 13. The summary of the data is shown in the following table.

TABLE 1

FIELD TRIAL DATA SUMMARY

| Parameter | Step 1 | Step 2 | Step 3 |
|---|---|---|---|
| Power Factor (PF) | 0.98 | 0.84 | 1.00 |
| kVA | 61.45 | 72.00 | 31.83 |
| kW | 60.21 | 60.65 | 31.83 |
| Load: | VFD operation 3 × NEMA B 50hp | Starter operation 3 × NEMA B 50hp | DCX & VFD operation 3 × NEMA B 50 hp |

As shown in TABLE 1, Step 3 utilizing controller 10 (denoted as DCX in the table) resulted in an optimal power factor of 1.00 and the lowest power draw of kilo-volts-amperes ("kVA") and kilowatts ("kW") of the three steps of the field trial.

In terms of operating costs measured, the following table illustrates a side-by-side comparison of the costs of Steps 1, 2 and 3 in the trial.

TABLE 2

YEARLY COST SUMMARY OF 3 STEPS OF FIELD TRIAL

| Item | Step 1 | Step 2 | Step 3 | |
|---|---|---|---|---|
| Yearly Cost of | $39904.77989 | $40295.96039 | $21100.89495 | kWh (8760 hours) |
| Operation | $9882.253904 | $11580.3307 | $5120.133585 | kVA (12 months) |
| Yearly Carbon Tax | $121.7893882 | $122.9832711 | $64.39993139 | per kWh |
| Sub-total: | $49908.82318 | $51999.27373 | $26285.42847 | kWh + kVA |
| Basic Monthly Charge | $737.88 | $737.88 | $737.88 | |
| Yearly Sub-total: | $50646.7 | $52737.15 | $27023.31 | |
| CA GST: | $2532.34 | $2636.86 | $1351.17 | |
| Sask. PST: | $3038.80 | $3164.23 | $1621.40 | |
| Yearly Total: | $56,217.84 | $58,538.24 | $29,995.87 | |

In reviewing the data of the field trial, it is apparent that operating three pump jacks with the use of controller 10 as described above has resulted in a significant reduction of electric power consumed from the electric utility that, in and of itself reduces the electric power operating costs of the pump jacks. In addition, the use of controller 10 results in the power drawn from the electric utility at a perfect power factor of 1.00, which also results in a reduction of cost of the electric power delivered by the utility. Further, the reduction of electric power consumed from the utility also results in a reduction in the carbon footprint of the pump jacks as less electricity generated by the utility is required to operate the pump jack, which also has the beneficial reduction in the carbon tax payable in respect of the electric power consumed from the utility to operate the pump jacks. Last, but not least, is a reduction in the federal goods and services tax ("GST") and provincial sales tax ("PST") payable to the utility that further reduces the overall operating costs in operating the three pumps using the systems and methods described herein as compared to conventional prior art methods to operate pump jacks.

Figure 14:
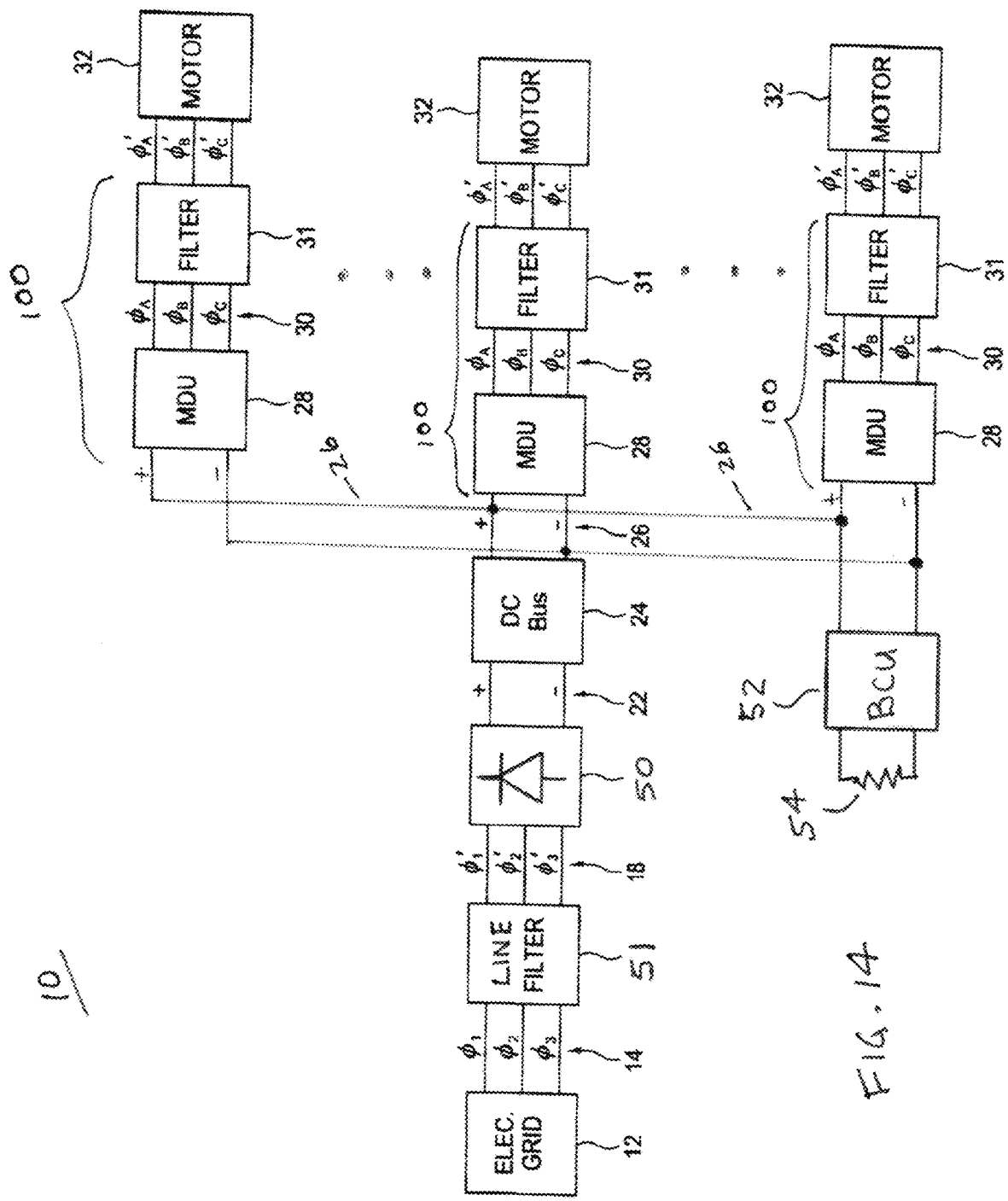
FIG. 14 is a block diagram depicting an alternate embodiment of the controller of FIG. 6 for use with a plurality of pump jacks.

Referring to FIG. 14, an alternate embodiment of controller 10 of FIG. 6 is shown. In some embodiments, controller 10 can substitute GDU 20 with rectifier unit 50 operatively coupled to electric power grid 12 via electrical connections 18. Rectifier unit 50 can comprise of rectifier products as manufactured by Semikron Inc. of Hudson, N.H., U.S.A., or any other suitable rectifier unit configured to rectify 3-phase electrical power for supplying rectified AC power to DC bus 24, via power connections 22, for powering pump jack motors as well known to those skilled in the art. In some embodiments, rectifier unit 50 can comprise a number of solid-state devices configured to rectify AC power into DC power, as known to those skilled in the art. Such solid-state devices can comprise any suitable device for providing an electrical rectifying function such as diodes, transistors, field effect transistors ("FETs"), MOSFETs, insulated gate bipolar transistors ("IGBTs"), silicon-controlled rectifiers ("SCRs"), triacs or any other equivalent functioning solid-state device as known to those skilled in the art.

In some embodiments, controller 10 can further comprise AC electrical power line filter unit 51 operatively disposed between electric power grid 12 and rectifier unit 50 via connections 14 and 18, to filter out noise and electrical harmonics of the AC power supplied by electric power grid 12 as well known to those skilled in the art. In some embodiments, rectifier unit 50 can supply rectified AC power to DC bus 24, wherein DC bus 24 can then, in turn, be operatively coupled to a plurality of motor controller systems 100, wherein each of motor controller systems 100 can provide electric power to a pump jack motor 32, via DC power connections 26 from DC bus 24 to the MDU 28 of each motor controller system 100. In some embodiments, this embodiment of controller 10 as shown in FIG. 14 can be used when there is no advantage in exporting electricity generated by the pump jack motors to electric power grid 12. In such embodiments, DC bus 24 can be operatively coupled to Brake Chopping Unit ("BCU") 52 via power connections 26, wherein BCU 52 can operatively couple DC bus 24 to braking resistor 54 when the DC voltage of DC bus 24 rises above a predetermined set point or threshold. When this occurs, BCU 52 can operatively couple DC bus 24 to braking resistor 54 to pass current therethrough as a means to lower the DC voltage of DC bus 24 below the predetermined set point or threshold, as well known to those skilled in the art. In a representative embodiment, the predetermined set point threshold can be 800 volts DC to ensure that the voltage on DC bus 24 does not exceed 810 volts DC. In some embodiments, BCU 50 can comprise a brake chopping unit as manufactured by Vacon PLC of Vaasa, Finland other functionally equivalent brake chopping units can be used as well known to those skilled in the art.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A pump jack controller system for converting waste energy created during the operation of one of a plurality of pump jacks into electrical energy that is then supplied back to other pump jacks of the plurality of pump jacks, each of the plurality of pump jacks operatively coupled to and operated by an electric motor, each of the plurality of pump jacks comprising a donkey-head and a counterweight operatively coupled thereto wherein each of the donkey-head and the counterweight rise and fall when each pump jack is operated by their electric motor, the pump jack controller system comprising:
   a) a plurality of motor drive units ("MDU"), one for each of the plurality of pump jacks, each MDU comprising a direct current ("DC") input and an alternating current ("AC") output, the AC output operatively coupled to one of the electric motors, the MDU configured to invert DC power supplied to the DC input into AC power that is outputted from the AC output to power the electric motor, the MDU further configured to rectify AC electric power generated by the electric motor into generated DC power that is outputted from the DC input when either of the donkey-head and the counterweight is falling thereby causing the motor to be in a negative torque operating condition;
   b) a DC bus operatively coupled to the DC input of each of the plurality of MDUs; and
   c) a rectifier unit comprising a DC output and an AC input, the DC output operatively coupled to the DC bus, the rectifier unit configured to rectify a source of supplied AC electric power from the power grid coupled to the AC input into DC power that is outputted onto the DC bus.

2. The system as set forth in claim 1, further comprising a line filter unit disposed between the AC input of the rectifier unit and the source of supplied AC electric power.

3. The system as set forth in claim 1, wherein each of the plurality of MDUs further comprises a first inverter-based motor drive unit.

4. The system as set forth in claim 1, wherein the DC bus comprises a filter capacitor.

5. The system as set forth in claim 1, wherein the source of supplied AC electric power is connected to an electric power grid.

6. The system as set forth in claim 5, wherein the source of supplied AC electric power comprises 3-phase AC electric power.

7. The system as set forth in claim 1, further comprising a brake chopping unit ("BCU") operatively coupled to the DC bus, the BCU configured to operatively couple a braking resistor to the DC bus when voltage on the DC bus exceeds a pre-set DC bus value.

8. The system as set forth in claim 1, wherein the electric motor comprises an asynchronous or induction electric motor.

9. The system as set forth in claim 1, wherein the electric motor comprises a synchronous or permanent magnet electric motor.

10. A method for converting waste energy created during the operation of one of a plurality of pump jacks into electrical energy that is then supplied to other pump jacks of the plurality of pump jacks, each of the plurality of pump jacks operatively coupled to and operated by an electric motor, each of the plurality of pump jacks comprising a donkey-head and a counterweight operatively coupled thereto wherein each of the donkey-head and the counterweight rise and fall when each pump jack is operated by the electric motor, the method comprising the steps of:
   a) receiving a pump jack controller system and operatively coupling the system to the plurality of pump jacks, the system further comprising:
      i) a plurality of motor drive units ("MDU"), one for each of the plurality of pump jacks, each MDU comprising a direct current ("DC") input and an alternating current ("AC") output, the AC output operatively coupled to one of the electric motors, the MDU configured to invert DC power supplied to the DC input into AC power that is outputted from the AC output to power the electric motor, the MDU further configured to rectify AC electric power generated by the electric motor into generated DC power that is outputted from the DC input when either of the donkey-head and the counterweight is falling thereby causing the motor to be in a negative torque operating condition, ii) a DC bus operatively coupled to the DC input of each of the plurality of MDUs, and
iii) a rectifier unit comprising a DC output and an AC input, the DC output operatively coupled to the DC bus, the rectifier unit configured to rectify a source of supplied AC electric power from the power grid coupled to the AC input into DC power that is outputted onto the DC bus;
b) supplying the source of supplied AC electric power to the system to power the electric motors to operate the plurality of pump jacks;
c) producing generated DC power with the electric motors when one or more of the electric motors is in a negative torque condition when either of the donkey-head and the counterweight is falling, wherein the generated DC power is outputted from the DC input of the MDU associated with the electric motor that is in the negative torque condition onto the DC bus; and
d) powering one or more of the plurality of pump jacks with the generated DC power.

11. The method as set forth in claim 10, wherein the pump jack controller system further comprises a line filter unit disposed between the AC input of the rectifier unit and the source of supplied AC electric power.

12. The method as set forth in claim 10, wherein each of the plurality of MDUs further comprises a first inverter-based motor drive unit.

13. The method as set forth in claim 10, wherein the DC bus comprises a filter capacitor.

14. The method as set forth in claim 10, wherein the source of supplied AC electric power is connected to an electric power grid.

15. The method as set forth in claim 14, wherein the source of supplied AC electric power comprises 3-phase AC electric power.

16. The method as set forth in claim 10, further comprising operatively coupling a brake chopping unit ("BCU") to the DC bus when voltage on the DC bus exceeds a pre-set DC bus value.

17. The method as set forth in claim 10, wherein the electric motor comprises an asynchronous or induction electric motor.

18. The method as set forth in claim 10, wherein the electric motor comprises a synchronous or permanent magnet electric motor.

* * * * *